(12) United States Patent

Liu et al.

(10) Patent No.:      US 12,595,701 B2

(45) Date of Patent:          Apr. 7, 2026

(54) MANUFACTURING METHOD OF AN INTELLIGENT ANTI-TERRORISM PROTECTIVE DOOR

(71) Applicant: Enyuan Liu, Yingkou (CN)

(72) Inventors: Lili Liu, Yingkou (CN); Enyuan Liu, Yingkou (CN)

(*) Notice:      Subject to any disclaimer, the term of this patent is extended or adjusted under 35 U.S.C. 154(b) by 127 days.

(21) Appl. No.: 18/401,247

(22) Filed:      Dec. 29, 2023

(65)            Prior Publication Data

US 2025/0215742 A1      Jul. 3, 2025

(51) Int. Cl.

| | |
|---|---|
| *E04C 2/32* | (2006.01) |
| *B05B 13/02* | (2006.01) |
| *B21D 28/26* | (2006.01) |
| *B23K 26/38* | (2014.01) |
| *E06B 5/12* | (2006.01) |
| *F41H 5/04* | (2006.01) |
| *F41H 5/22* | (2006.01) |

(52) U.S. Cl.

CPC .............. *E06B 5/12* (2013.01); *B05B 13/02* (2013.01); *B21D 28/26* (2013.01); *B23K 26/38* (2013.01); *F41H 5/0442* (2013.01); *F41H 5/226* (2013.01)

(58) Field of Classification Search

CPC .... E06B 5/12; E06B 3/728; E06B 2003/7074; E06B 3/7015; E06B 2003/703; B21D 28/26; B21D 53/74; F41H 5/226

See application file for complete search history.

(56)            References Cited

U.S. PATENT DOCUMENTS

| | | | | | |
|---|---|---|---|---|---|
| 1,915,398 | A | * | 6/1933 | Bedell | B21D 53/74 |
| | | | | | 228/171 |
| 2,023,661 | A | * | 12/1935 | Beyrle | E06B 3/9604 |
| | | | | | 52/784.11 |
| 2,860,388 | A | * | 11/1958 | Chapman | B27D 1/06 |
| | | | | | 428/120 |
| 2,924,861 | A | * | 2/1960 | Viets | E06B 1/52 |
| | | | | | 52/784.1 |
| 4,562,677 | A | * | 1/1986 | Hrabak | E06B 3/96 |
| | | | | | 52/211 |
| 4,998,598 | A | * | 3/1991 | Mardian | E06B 5/20 |
| | | | | | 181/290 |
| 5,018,263 | A | * | 5/1991 | Stern | E05D 15/0665 |
| | | | | | 160/371 |
| 5,787,677 | A | * | 8/1998 | Bolich | E06B 3/7001 |
| | | | | | 52/789.1 |
| 6,312,540 | B1 | * | 11/2001 | Moyes | E04C 2/34 |
| | | | | | 156/87 |
| 2007/0266661 | A1 | * | 11/2007 | Abbas-ul-Husaini | E06B 3/78 |
| | | | | | 52/309.9 |
| 2011/0131921 | A1 | * | 6/2011 | Chen | E06B 5/161 |
| | | | | | 52/784.1 |
| 2012/0085223 | A1 | * | 4/2012 | Kennedy | E06B 5/12 |
| | | | | | 89/36.02 |
| 2014/0000195 | A1 | * | 1/2014 | Daniels | C04B 20/0068 |
| | | | | | 52/784.11 |
| 2018/0066429 | A1 | * | 3/2018 | Yau | E04C 2/523 |
| 2020/0011113 | A1 | * | 1/2020 | Shambeau | E06B 3/82 |
| 2020/0072580 | A1 | * | 3/2020 | Deering | F41H 5/24 |
| 2020/0355020 | A1 | * | 11/2020 | Clark | E06B 3/7015 |
| 2021/0009170 | A1 | * | 1/2021 | Okazaki | B61D 19/02 |

* cited by examiner

*Primary Examiner* — Basil S Katcheves

(57)            ABSTRACT

A manufacturing method of an intelligent anti-terrorism protective door comprises the following steps: S1, making front and rear door panels; S2, cutting the composite door core panel materials; S3, making protective door frame; S4, assembling bulletproof and explosion-proof armored composite door core panel; S5, making the door frame; S6, decorating the surface of the protective door; S7, overall assembly; S8, installing the lock; S9, packaging the protective door. The manufacturing method is simple and easy to implement, with strict control over every aspect from raw materials, production processes, to quality control during the manufacturing process, ensuring the product quality. This not only makes the product fire-proof and anti-theft, but also has explosion-proof and bulletproof properties, effectively preventing explosions and bullet attacks, greatly improving the security of the protective door.

5 Claims, No Drawings

MANUFACTURING METHOD OF AN INTELLIGENT ANTI-TERRORISM PROTECTIVE DOOR

1. TECHNICAL FIELD

The invention relates to the technical field of manufacturing protective doors, in particular to a manufacturing method of an intelligent anti-terrorism protective door.

2. BACKGROUND ART

With the continuous development of science and technology, people's awareness of safety and their living standards have been continuously improving. As a result, an increasing number of people are choosing to use protective doors as their main entrance security doors.

The full name of a protective door is "anti-theft security door", which combines anti-theft and safety properties. At present, ordinary security doors on the market have a simple structure, use single materials, and are completed through welding and spraying, lacking the ability to prevent explosions or bullet impacts, thus having low security;

Even the current ordinary bulletproof doors only have individual bulletproof functions, and the bulletproof requirements are relatively low. Only the door body is bulletproof, not the entire door, moreover, they do not have explosion-proof or fire-proof functions. Many users now require a door that has bullet-proof, explosion-proof, fire-proof, and anti-theft functions. Currently, this type of ordinary protective door cannot meet the above requirements.

Therefore, a manufacturing method of an intelligent anti-terrorism protective door is proposed to solve the current shortcomings.

3. SUMMARY OF THE INVENTION

The technical problem to be solved by the invention is to overcome the defects of the above technology and provide a manufacturing method of an intelligent anti-terrorism protective door.

To realize the above technical problem, the technical scheme provided by the invention is as follow: a manufacturing method of an intelligent anti-terrorism protective door comprises the following steps:

S1, making front and rear door panels: the door panels are made of low-carbon steel plates with a thickness of 1.5 mm, they are cut according to the specified dimensions and then folded into shape by a bending machine, it is required that the end faces of the panels are smooth and any burrs are properly handled, they are then set aside for later use;

S2, cutting the composite door core panel materials: checking the materials and specifications of each layer of the composite door core panel, cutting the core panel materials into the specified dimensions with a laser cutting machine, and punching out the lock holes and installation process holes accordingly;

S3, making protective door frame: the material of the frame is made of low-carbon steel plate with a thickness of 3.5 mm, which is cut according to the specified dimensions, and then punched and welded to form the frame, the tolerance of the finished product is no more than 0.3 mm;

S4, assembling bulletproof and explosion-proof armored composite door core panel: coating the front and rear mating surfaces of each layer of the composite door core panel with two-component silicone adhesive, then assembling them in the frame in sequence, assembling the front and rear door panels on the front and back of the frame respectively, then placed in a pressing machine to be pressed into the specified dimensions, afterwards, left to dry naturally for 6 hours in a ventilated area, the production of the composite door core panel is completed;

S5, making the door frame: cutting the high-strength tough steel plate with a thickness of 2.5 mm into specified dimensions, and pulling it into shape through a frame material rolling machine, removing burrs, and welding it into shape, the tolerance of the finished product should not exceed 0.3 mm according to the design requirements;

S6, decorating the surface of the protective door: spray-painting the processed door frame, composite door core panel, and protective door front and rear panels, and hunging them on the curing oven production line for spray coating and curing;

S7, overall assembly: first, vertically placing the door frame on an assembly workbench, installing the composite door core panel into the door frame, installing hinges, adjusting the door gap, and checking whether the composite door core panel is parallel to the door frame;

S8, installing the lock: first, checking whether the lock hole and lock match stably, installing the lock into the lock hole, then installing the lock core into the lock, using an electric screwdriver to tighten the front and back screws, connecting the power supply, and performing switch debugging until it reaches a state of free switching.

S9, packaging the protective door: checking the door accessories and placing them inside a wooden packaging box along with the protective door, covering the door with bubble wrap to prevent the collision and damage, then, securing it with iron packaging tape, and the packaging is completed.

As an improvement, the composite door core panel materials comprise explosion-proof and bullet-proof materials, high-temperature resistant materials, explosion-proof and bullet-proof superimposed materials, impact-resistant buffer materials, anti-nuclear radiation materials, thermal insulation and fireproof materials.

As an improvement, in S6, the drying oven temperature of the curing oven production line must not be lower than 200° C., and the curing time is 20 min.

As an improvement, in S7, the upper side gap and the left and right side gaps between the composite door core panel and the door frame are not larger than 2.5 mm, and the lower side gap is not larger than 5 mm.

As an improvement, the door accessories comprise screws for fixed installation, a remote control, and a manual opening key.

Compared with the prior art, the invention has the following advantages:

1. The armored composite door core panel is formed by combining a variety of materials, and combined with its door frame, panels, etc. to form its complete structure, the invention has the fireproof and anti-theft functions, and also increases its anti-explosion, bulletproof and radiation-proof functions to achieve multi-performance integration and improve its security;

2. Through the implementation of processes such as front and rear door panels, composite door core panel, protective door frame, assembly, and lock installation, the overall manufacture of the protective door is achieved, ensuring the integrity, practicality, and aesthetics of its structure, and achieving its design goals, at the same time, the intelligent lock enhances the intelligence of the protective door, achieving the integration of multiple protection and intelligent function, greatly improving the security of the protective door;

3. The manufacturing method is simple and easy to implement, with strict control over every aspect from raw materials, production processes, to quality control during the manufacturing process, ensuring the product quality, this not only makes the product fire-proof and anti-theft, but also has explosion-proof and bulletproof properties, effectively preventing explosions and bullet attacks, greatly improving the security of the protective door.

4. SPECIFIC EMBODIMENT OF THE INVENTION

When the terms "horizontal", "vertical", "overhanging" and other terms appear, it does not mean that the component is required to be absolutely horizontal or overhanging, but can be slightly inclined. For example, "horizontal" simply means that its direction is more horizontal than "vertical", it does not mean that the structure must be completely horizontal, but can be slightly inclined.

In the description of the invention, "a plurality of" means at least two.

In the description of the invention, it should also be noted that the terms of "arrange", "install", "link", "connect", etc., should be generally understood unless there are specific restrictions or stipulations, for example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

A manufacturing method of an intelligent anti-terrorism protective door comprises the following steps:

S1, making front and rear door panels: the door panels are made of low-carbon steel plates with a thickness of 1.5 mm, they are cut according to the specified dimensions and then folded into shape by a bending machine, it is required that the end faces of the panels are smooth and any burrs are properly handled, they are then set aside for later use;

S2, cutting the composite door core panel materials: checking the materials and specifications of each layer of the composite door core panel, cutting the core panel materials into the specified dimensions with a laser cutting machine, and punching out the lock holes and installation process holes accordingly;

Specifically, the material and combination settings of the composite door core panel materials can be set according to the actual situation. In this embodiment, the composite door core panel materials comprise explosion-proof and bulletproof materials, high-temperature resistant materials, explosion-proof and bullet-proof superimposed materials, impact-resistant buffer materials, anti-nuclear radiation materials, thermal insulation and fireproof materials.

S3, making protective door frame: the material of the frame is made of low-carbon steel plate with a thickness of 3.5 mm, which is cut according to the specified dimensions, and then punched and welded to form the frame, the tolerance of the finished product is no more than 0.3 mm;

S4, assembling bulletproof and explosion-proof armored composite door core panel: coating the front and rear mating surfaces of each layer of the composite door core panel with two-component silicone adhesive, then assembling them in the frame in sequence, assembling the front and rear door panels on the front and back of the frame respectively, then placed in a pressing machine to be pressed into the specified dimensions, afterwards, left to dry naturally for 6 hours in a ventilated area, the production of the composite door core panel is completed;

During the specific implementation, the explosion-proof and bullet-proof materials, high-temperature resistant materials, explosion-proof and bullet-proof superimposed materials, impact-resistant buffer materials, anti-nuclear radiation materials, thermal insulation and fireproof materials are arranged in order, and the mating surfaces are applied with two-component silicone adhesive, and assemblied.

S5, making the door frame: cutting the high-strength tough steel plate with a thickness of 2.5 mm into specified dimensions, and pulling it into shape through a frame material rolling machine, removing burrs, and welding it into shape, the tolerance of the finished product should not exceed 0.3 mm according to the design requirements;

S6, decorating the surface of the protective door: spray-painting the processed door frame, composite door core panel, and protective door front and rear panels, and hunging them on the curing oven production line for spray coating and curing;

Specifically, the drying oven temperature of the curing oven production line must not be lower than 200° C., and the curing time is 20 min.

S7, overall assembly: first, vertically placing the door frame on an assembly workbench, installing the composite door core panel into the door frame, installing hinges, adjusting the door gap, and checking whether the composite door core panel is parallel to the door frame;

During the specific implementation, the upper side gap and the left and right side gaps between the composite door core panel and the door frame are not larger than 2.5 mm, and the lower side gap is not larger than 5 mm.

S8, installing the lock: first, checking whether the lock hole and lock match stably, installing the lock into the lock hole, then installing the lock core into the lock, using an electric screwdriver to tighten the front and back screws, connecting the power supply, and performing switch debugging until it reaches a state of free switching.

S9, packaging the protective door: checking the door accessories and placing them inside a wooden packaging box along with the protective door, covering the door with bubble wrap to prevent the collision and damage, then, securing it with iron packaging tape, and the packaging is completed.

Specifically, the door accessories comprise screws for fixed installation, a remote control, and a manual opening key.

The invention claimed is:

1. A manufacturing method of an intelligent anti-terrorism protective door comprises the following steps:

step one, making front and rear door panels: the door panels are made of low-carbon steel plates with a thickness of 1.5 mm, they are cut according to specified dimensions and then folded into shape by a bending machine, end faces of the panels are smooth and any burrs are properly handled, they are then set aside for later use;

step two, cutting composite door core panel materials: checking said materials and specifications of layers of the composite door core panel, cutting the core panel materials into the specified dimensions with a laser cutting machine, and punching out lock holes and installation process holes accordingly;

step three, making a protective door frame: material of the frame is of low-carbon steel plate with a thickness of 3.5 mm, which is cut according to specified dimensions, and then punched and welded to form the frame, tolerance of finished product is no more than 0.3 mm;

step four, assembling the composite door core panel: coating front and rear mating surfaces of each layer of the composite door core panel with two-component silicone adhesive, then assembling them in the frame in sequence, assembling the front and rear door panels on a front and a back of the frame respectively, placing the front and rear door panels and the front and back of the frame in a pressing machine to be pressed into specified dimensions, afterwards, drying the front and rear door panels and the front and back of the frame naturally for 6 hours in a ventilated area, production of the composite door core panel is completed;

step five, making the door frame: cutting high-strength tough steel plate with a thickness of 2.5 mm into specified dimensions, and pulling it into shape through a frame material rolling machine, removing burrs, and welding it into shape, tolerance of finished product should not exceed 0.3 mm according to design requirements;

step six, decorating a surface of the protective door: spray-painting processed door frame, composite door core panel, and protective door front and rear panels, and hanging the processed door frame, the composite door core panel, and the protective door front and rear panels on a curing oven production line for spray coating and curing;

step seven, first, vertically placing the door frame on an assembly workbench, installing the composite door core panel into the door frame, installing hinges, adjusting door gap, and checking whether the composite door core panel is parallel to the door frame;

step eight, installing a lock: first, checking whether a lock hole and the lock match stably, installing the lock into the lock hole, then installing a lock core into the lock, using an electric screwdriver to tighten front and back screws, connecting a power supply, and performing switch debugging;

step nine, packaging the protective door: checking door accessories and placing them inside a wooden packaging box along with the protective door, covering the door with bubble wrap to prevent collision and damage, then, securing it with iron packaging tape, and packaging is then completed.

2. The manufacturing method of an intelligent anti-terrorism protective door of claim 1, the composite door core panel materials comprise explosion-proof and bullet-proof materials, high-temperature resistant materials, explosion-proof and bullet-proof superimposed materials, impact-resistant buffer materials, anti-nuclear radiation materials, thermal insulation and fireproof materials.

3. The manufacturing method of an intelligent anti-terrorism protective door of claim 1, in step six, a drying oven temperature of the curing oven production line is not lower than 200° C., and curing time is 20 min.

4. The manufacturing method of an intelligent anti-terrorism protective door of claim 1, in step seven, an upper side gap and left and right side gaps between the composite door core panel and the door frame are not larger than 2.5 mm, and a lower side gap is not larger than 5 mm.

5. The manufacturing method of an intelligent anti-terrorism protective door of claim 1, door accessories comprise screws for fixed installation, a remote control, and a manual opening key.

* * * * *